(12) United States Patent
Larson

(10) Patent No.: US 6,363,446 B1
(45) Date of Patent: Mar. 26, 2002

(54) METHOD FOR SELECTIVELY ENCODING BUS GRANT LINES TO REDUCE I/O PIN REQUIREMENTS

(75) Inventor: Douglas A. Larson, Lakeville, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/332,278

(22) Filed: Jun. 12, 1999

(51) Int. Cl.[7] ............................................... G06F 13/36
(52) U.S. Cl. ..................... 710/113; 710/107; 710/110; 710/116; 710/119; 710/240
(58) Field of Search ................................ 710/107, 113, 710/116, 119, 240–244

(56) References Cited

U.S. PATENT DOCUMENTS

| | | | | | |
|---|---|---|---|---|---|
| 4,604,689 | A | * | 8/1986 | Burger | 710/101 |
| 5,113,514 | A | * | 5/1992 | Albonesi et al. | 711/144 |
| 6,018,807 | A | * | 1/2000 | Larson | 714/33 |
| 6,026,046 | A | * | 2/2000 | Larson | 365/230.06 |
| 6,029,217 | A | * | 2/2000 | Arimilli et al. | 710/107 |
| 6,286,068 | B1 | * | 9/2001 | Arimilli et al. | 710/107 |

* cited by examiner

Primary Examiner—Rupal Dharia
(74) Attorney, Agent, or Firm—Park, Vaughan & Fleming LLP

(57) ABSTRACT

One embodiment of the present invention provides a method for selectively encoding bus grant lines to reduce I/O pin requirements. The method includes receiving a number of grant lines emanating from a bus arbitration circuit and encoding the grant lines into a smaller number of encoded grant lines. The method selects outputs from between the encoded grant lines and a first subset of the grant lines. These outputs are driven off of a semiconductor chip through a number of output pins. During a first mode of operation, the first subset of grant lines is selected to be driven through the output pins. During a second mode of operation, the encoded grant lines are selected to driven through the output pins. In a variation on the above embodiment, the method additionally receives a number of bus request lines. These request lines are divided into a first subset and a second subset. The first subset of request lines is received through a number of input pins from off of the semiconductor chip. During the first mode of operation, the second subset of request lines is received from off of the semiconductor chip through a number of I/O pins and bi-directional buffers into the bus arbitration circuit. This first mode of operation allows more request lines to be used in conjunction with the plurality of encoded grant lines. During the second mode of operation, the second subset of bus grant lines feeds from the bus arbitration circuit through the bi-directional buffers and I/O pins and off of the semiconductor chip. This second mode of operation allows more pins to be used for grant lines when grant lines are not encoded.

20 Claims, 5 Drawing Sheets

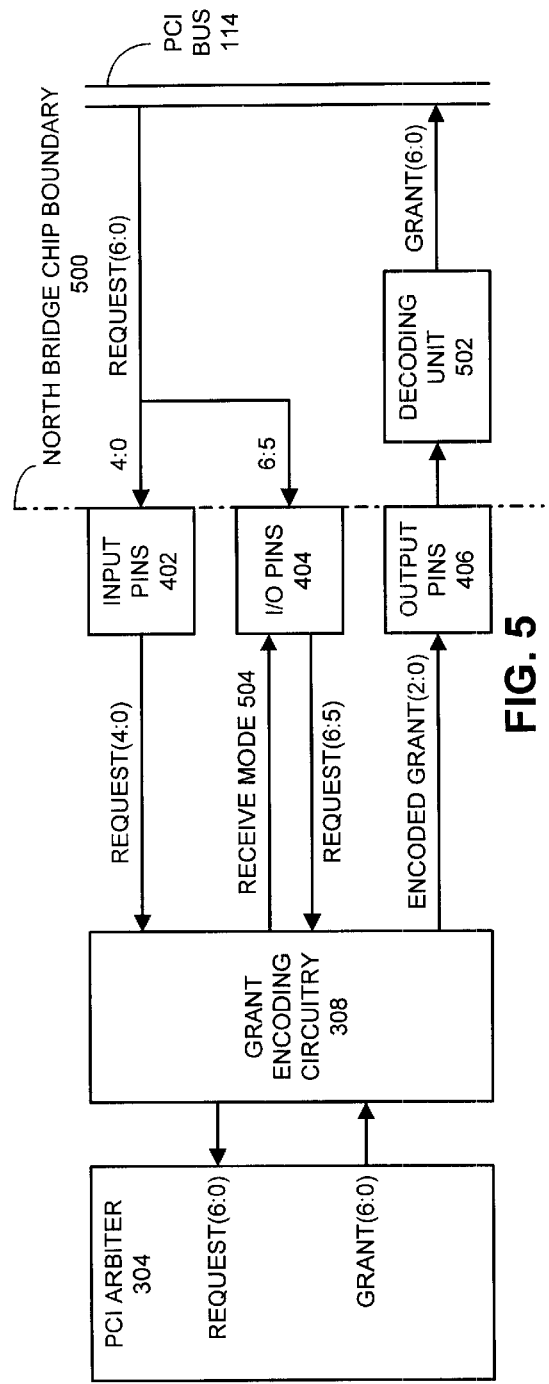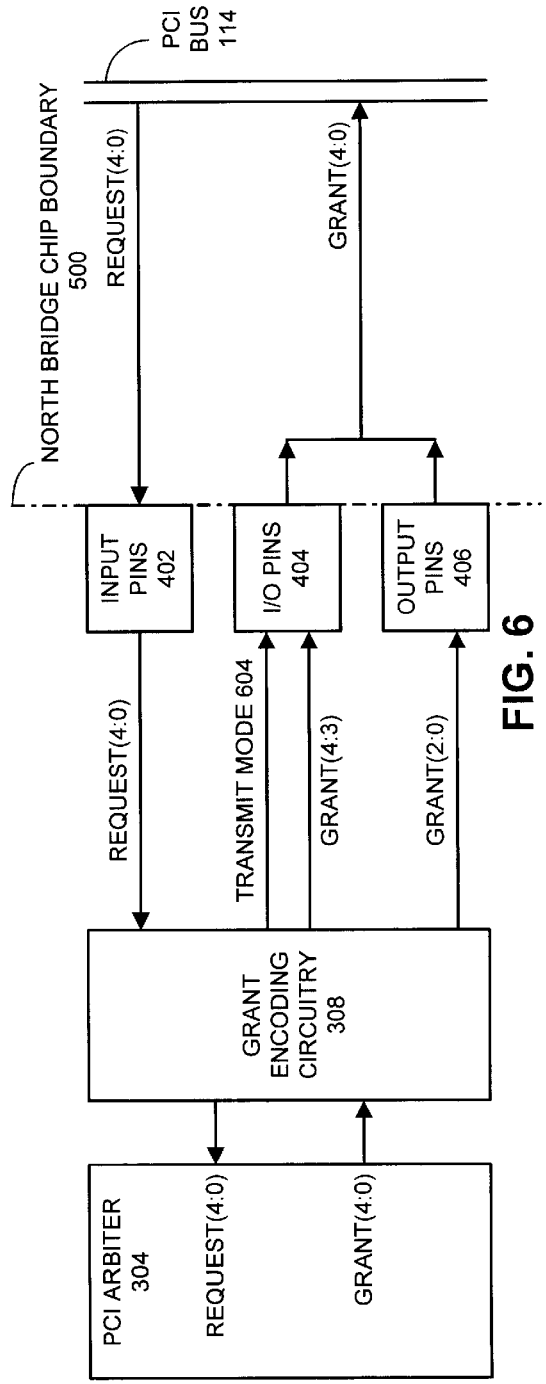

METHOD FOR SELECTIVELY ENCODING BUS GRANT LINES TO REDUCE I/O PIN REQUIREMENTS

RELATED APPLICATION

The subject matter of this application is related to the subject matter in a co-pending non-provisional application by the same inventor(s) as the instant application and filed on the same day as the instant application entitled, "Apparatus for Selectively Encoding Bus Grant Lines to Reduce I/O Pin Requirements," having Ser. No. 09/332,279, and filing date Jun. 12, 1999.

BACKGROUND

1. Field of the Invention

The present invention relates to buses in computer systems. More particularly, the present invention relates to a method for selectively encoding bus grant lines to reduce I/O pin requirements.

2. Related Application

Much of the interconnection circuitry in a microprocessor-based computer system is typically aggregated in a "core logic" unit that couples the microprocessor to other parts of the computer system, such as a memory, a peripheral bus and a graphics controller.

Providing such interconnection capability can require a large number of I/O pins to accommodate all of the signal lines. Some computer systems deal with this I/O pin problem by partitioning interconnection circuitry across multiple chips. For example, a typical personal computer system includes a north bridge chip, a south bridge chip, a super I/O chip and an I/O APIC chip to support interconnections between the microprocessor and other components within the computer system. Using multiple chips is expensive because the multiple chips must be integrated together within a circuit board. This leads to additional expense in manufacturing circuit boards and maintaining inventories of each type of chip.

It is preferable to integrate all of the interconnection circuitry in a computer system into a single semiconductor chip. However, the I/O pin limitations on a single chip can present problems. For example, a single core logic chip that includes all of a computer system's interconnection circuitry requires interfaces for a processor bus, a memory bus, an AGP bus for a graphics controller and a PCI bus for peripheral devices. Providing I/O pins for all of these interfaces requires many hundreds of I/O pins, especially if any of the busses support 64 bit transfers. Given present packing technology, this I/O pin requirement can easily exceed the I/O pin limitations of a single semiconductor chip.

Note that many bus signals lines are not utilized as well as they could be. In particular bus grant lines and bus request lines convey very little information. Recall that bus request lines are used by devices on the bus to request control of the bus from a bus arbiter in order to perform bus accesses. Bus grant lines are used by the bus arbiter to grant control of the bus to a requester. In a typical bus, such as the PCI bus, there is one request line and one grant line for each master device on the bus. For example, the PCI bus supports up to seven bus request lines and seven bus grant lines. Note that since the bus arbiter will only grant control of the bus to one device at a time, only one of the bus grant lines will be active at any one time. Hence, bus grant lines typically convey very little information.

In order to conserve on the number of I/O pins used, typical core logic chips provide a limited number of request lines and grant lines. This limits the number of bus master devices that can be supported. Unfortunately, this means that typical core logic chips cannot be used in other computer systems, such as servers, that must support a larger number of bus master devices.

What is needed is a method and an apparatus that allows a number of bus grant lines to be transferred across a smaller number I/O pins.

SUMMARY

One embodiment of the present invention provides a method for selectively encoding bus grant lines to reduce I/O pin requirements. The method includes receiving a number of grant lines emanating from a bus arbitration circuit and encoding the grant lines into a smaller number of encoded grant lines. The method selects outputs from between the encoded grant lines and a first subset of the grant lines. These outputs are driven off of a semiconductor chip through a number of output pins. During a first mode of operation, the first subset of grant lines is selected to be driven through the output pins. During a second mode of operation, the encoded grant lines are selected to driven through the output pins. In a variation on the above embodiment, the method additionally receives a number of bus request lines. These request lines are divided into a first subset and a second subset. The first subset of request lines is received through a number of input pins from off of the semiconductor chip. During the first mode of operation, the second subset of request lines is received from off of the semiconductor chip through a number of I/O pins and bi-directional buffers into the bus arbitration circuit. This first mode of operation allows more request lines to be used in conjunction with the plurality of encoded grant lines. During the second mode of operation, the second subset of bus grant lines feeds from the bus arbitration circuit through the bi-directional buffers and I/O pins and off of the semiconductor chip. This second mode of operation allows more pins to be used for grant lines when grant lines are not encoded.

Thus, the present invention facilitates encoding of bus grant lines in a first mode of operation to support additional bus master devices. It also facilitates a second mode of operation in which bus grant lines are not encoded. This second mode reduces cost for systems that do not require additional bus master devices because the second mode does not require external decoding circuitry to decode the bus grant lines.

BRIEF DESCRIPTION OF THE FIGURES

FIG. 5 illustrates grant encoding circuitry used in a first mode of operation in accordance with an embodiment of the present invention.

FIG. 6 illustrates grant encoding circuitry used in a second mode of operation in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirt and scope of the present invention. Thus, the present invention is not intended to be limited to the embodiments shown, but is to be accorded the widest scope consistent with the principles and features disclosed herein.

Computer System

Figure 1:
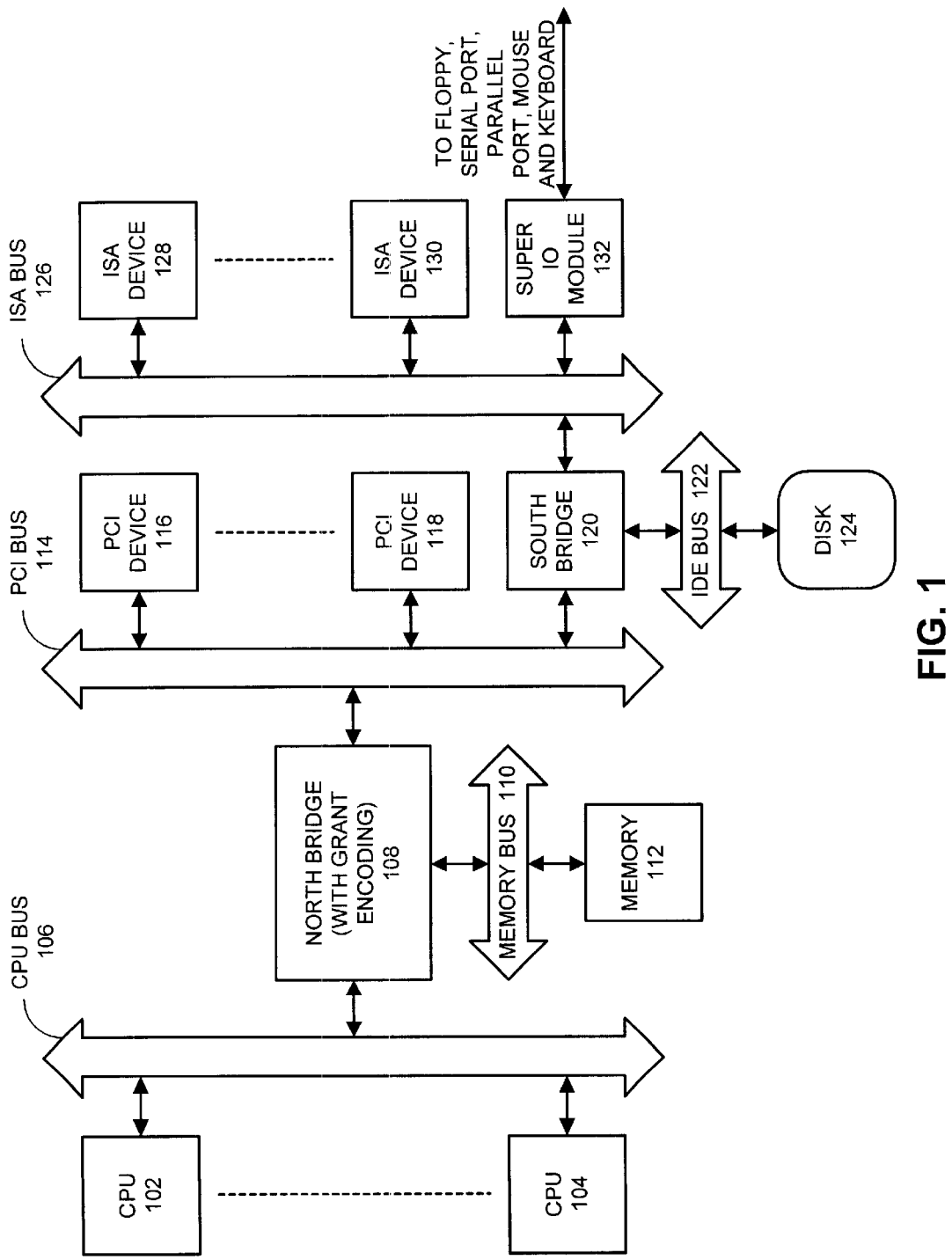
FIG. 1 illustrates a computer system in accordance with an embodiment of the present invention.

FIG. 1 illustrates a computer system in accordance with an embodiment of the present invention. The computer system illustrated in FIG. 1 includes a number of components coupled together by a number of buses. More specifically, the computer system illustrated in FIG. 1 includes CPU bus 106, memory bus 110, PCI bus 114, ISA bus 126 and IDE bus 122.

CPU bus 106 couples a number of central processing units (CPUs), including CPUs 102 and 104, to north bridge 108. CPUs 102 and 104 can include any type of central processing units capable of performing computational operations in a computing system, including but not limited to microprocessors, mainframe processors, device controllers and computing devices in appliances. Also note that the present invention applies to computing systems with a single CPU. CPU bus 106 can include any type of communication channel for coupling together CPUs 102 and 104 and north bridge 108.

North bridge 108 is a core logic unit that includes circuitry for interconnecting computer system components. More specifically, north bridge 108 couples together CPU bus 106, memory bus 110 and PCI bus 114. Note that north bridge 108 includes circuitry to encode bus grant lines in accordance with an embodiment of the present invention.

Memory bus 110 couples north bridge 108 to memory 112. Memory 112 can include any type of semiconductor memory for storing code and data to be executed by CPUs 102 and 104. Memory bus 110 can include any communication channel that supports accesses by CPUs 102 and 104 to memory 112 through north bridge 108.

PCI bus 114 couples north bridge 108 to a number of PCI bus devices, including PCI devices 116 and 118 and south bridge 120. PCI devices 116 and 118 can include any type of bus master and/or bus target devices residing on PCI bus 114. South bridge 120 is an additional core logic unit that couples PCI bus 114 to IDE bus 122 and ISA bus 126.

IDE bus 122 couples PCI bus 114 to disk 124. Disk 124 can include any type of non-volatile magnetic and/or optical storage device for storing code and/or data to be executed by CPUs 102 and 104. In one embodiment of the present invention, disk 124 includes a magnetic disk drive. IDE bus 122 can include any communication channel that facilitates communications between south bridge 120 and disk 124.

ISA bus 126 couples south bridge 120 to a number of ISA bus devices, including ISA bus devices 128 and 130 and super I/O module 132. ISA bus devices 128 and 130 can include any type of bus master and/or bus target devices for ISA bus 126. Super I/O module includes circuitry to facilitate communications with a number of I/O devices for the computer system, including but not limited to a floppy disk, a serial port, a parallel port, a mouse and a keyboard.

Note that north bridge 108 and south bridge 120 are both coupled to a number of buses, and hence require large numbers of I/O pins to connect to these buses. Also note that if a single semiconductor package can accommodate a large number of I/O pins it may be possible to combine north bridge 108 and south bridge 120 into a single core logic chip.

Core Logic Unit

Figure 2:
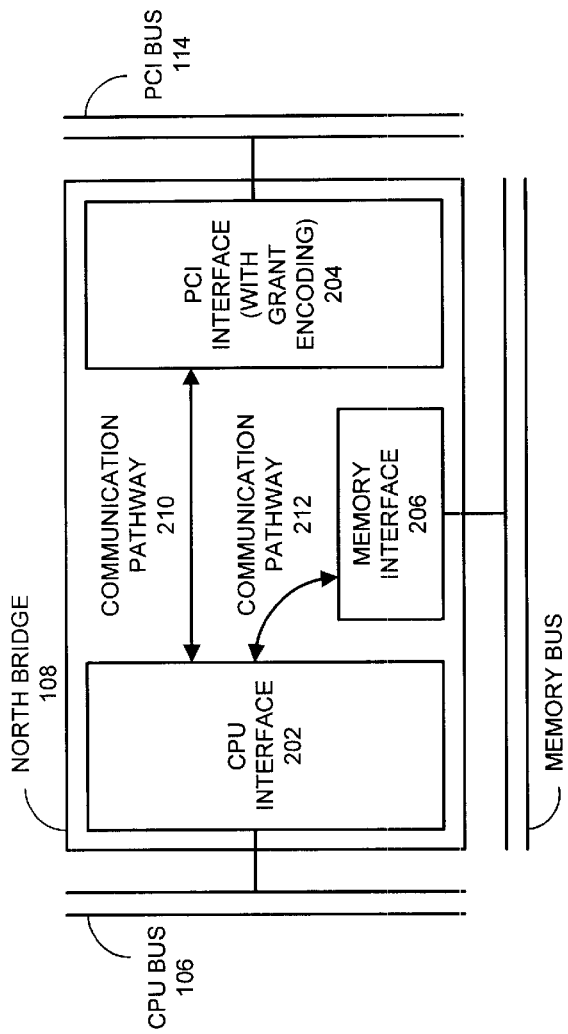
FIG. 2 illustrates part of the internal structure of a core logic unit in accordance with an embodiment of the present invention.

FIG. 2 illustrates part of the internal structure of north bridge 108 in accordance with an embodiment of the present invention. North bridge 108 includes circuitry to implement a number of bus interfaces. More specifically, north bridge 108 includes CPU interface 202, memory interface 206 and PCI interface 204, for coupling north bridge 108 with CPU bus 106, memory bus 110 and PCI bus 114, respectively.

Note that PCI interface 204 is coupled to CPU interface 202 through communication pathway 210. Similarly, memory interface 206 is coupled to CPU interface 202 through communication pathway 212. Communication pathways 210 and 212 can include any type of communication channels for transferring information between bus interfaces. In one embodiment of the present invention, communication pathways 210 and 212 are part of a single communication channel. In another embodiment, communication pathways 210 and 212 are separate communication channels. Note that there is no communication pathway directly linking PCI interface 204 with memory interface 206. This ensures that all communications between PCI interface 204 and memory interface 206 pass across CPU bus 106 so that the communications can be "snooped" on CPU bus 106 for cache coherency purposes.

Bus Interface

Figure 3:
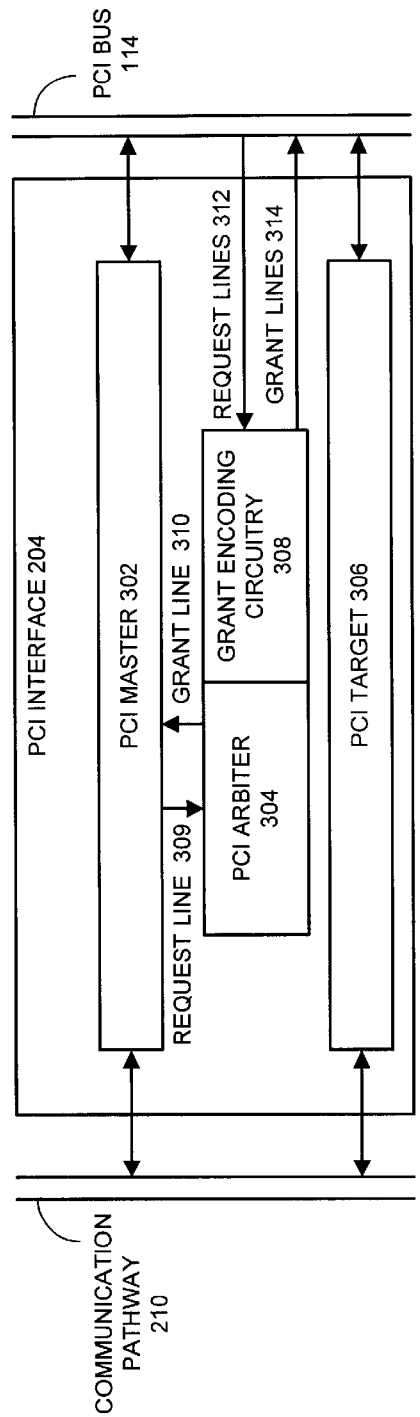
FIG. 3 illustrates part of the internal structure of a bus interface in accordance with an embodiment of the present invention.

FIG. 3 illustrates part of the internal structure of PCI interface 204 in accordance with an embodiment of the present invention. PCI interface 204 includes a number of internal components, including PCI master 302, PCI arbiter 304 and PCI target 306. PCI master 302 includes circuitry for initiating accesses across PCI bus 114. PCI target 306 includes circuitry to fulfill access requests from a bus master, such as PCI master 302, across PCI bus 114. Note that both PCI master 302 and PCI target 306 are coupled to PCI bus 114 as well as communication pathway 210. During operation, PCI interface 204 generally supports communications between PCI bus 114 and communication pathway 210 through PCI master 302 and PCI target 306.

PCI arbiter 304 includes circuitry to arbitrate between various devices on PCI bus 114 in order to grant bus master status to bus master devices on PCI bus 114. Bus master status allows a device on PCI bus 114 to initiate a data transfer operation such as a read or a write request across PCI bus 114.

PCI arbiter 304 communicates with devices on PCI bus 114 through grant and request lines. Each bus master device on PCI bus 114 has dedicated grant and request lines through which it can communicate with PCI arbiter 304. For example, PCI master 302 communicates with PCI arbiter 304 through request line 309 and grant line 310. In order to gain access to PCI bus 114, PCI master 302 asserts request line 309. PCI arbiter 304 then decides which requester is most deserving (typically using some type of fairness algorithm) and eventually asserts grant line 310 to allow PCI master 302 to initiate an access across PCI bus 114.

In order to conserve on the number of I/O pins for grant lines, PCI arbiter passes request lines 312 and grant lines 314 through grant encoding circuitry 308 before request lines 312 and grant lines 314 connect to PCI bus 114.

Circuitry to Selectively Encode Grant Lines

Figure 4:
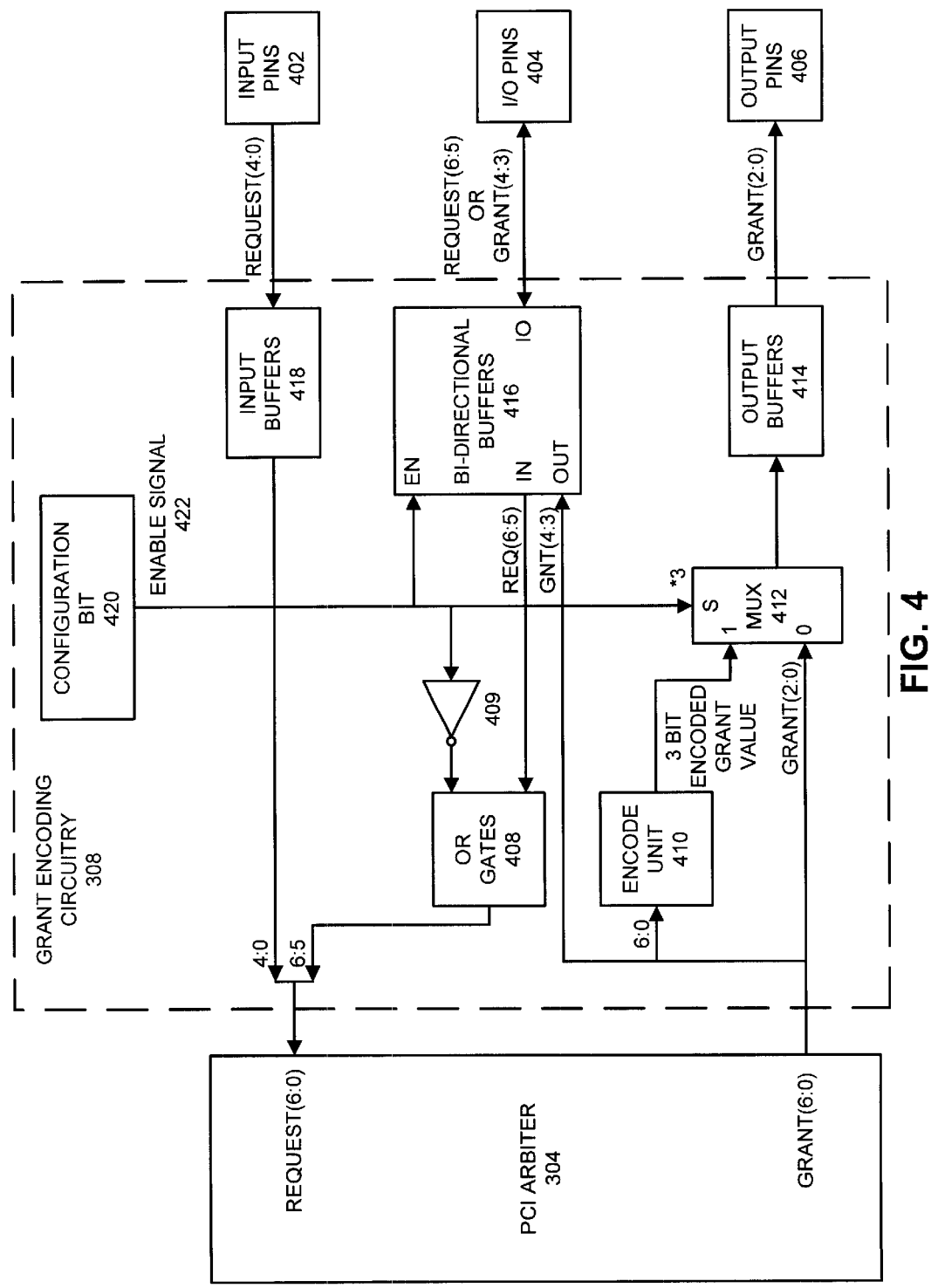
FIG. 4 illustrates circuitry to selectively encode grant lines in accordance with an embodiment of the present invention.

FIG. 4 illustrates the structure of grant encoding circuitry 308 in accordance with an embodiment of the present invention. Grant encoding circuitry couples request lines (6:0) and grant lines (6:0) from PCI arbiter 304 to a number of I/O pins, including input pins 402, I/O pins 404 and output pins 406. Note that in one embodiment of the present invention, input pins 402, I/O pins 404 and output pins 406 are all implemented as I/O pins. However, for the explanation that follows these pins are labelled as input pins 402, I/O pins 404 or output pins 406 to indicate the direction of data flow.

Grant lines (6:0) are encoded as follows. Grant lines (6:0) pass through encode unit 410, which encodes the one-hot unary value on grant lines (6:0) into a three-bit binary encoded value. This three bit encoded value passes into multiplexer (MUX) 412, which selects between the encoded grant value and the lower three lines of grant lines (6:0). The outputs of MUX 412, labelled as grant lines (2:0), pass through output buffers 414, which drive grant lines (2:0) through output pins 406 onto PCI bus 114. Two additional grant lines (4:3) pass through bi-directional buffers 416, which can drive grant lines (4:3) through I/O pins 404 onto PCI bus 114.

Request lines (6:0) pass through grant encoding circuitry 308 as follows. The lower five lines (4:0) of request lines (6:0) pass through input pins 402 and input buffers 418 before feeding into PCI arbiter 304. The two upper lines (6:5) feed through I/O pins 404 and bi-directional buffers 416 before feeding through OR gates 408 into PCI arbiter 304. Note that OR gates 408 perform an OR operation between the inverse of enable signal 422 and request lines (6:5) so that request lines (6:5) always assume an unasserted high value when enable signal 422 assumes a low value. This effectively disables request lines (6:5).

Note that enable signal 422 feeds from configuration bit 420 into OR gates 408, MUX 412 and bidirecitional buffers 416. Configuration bit 420 can be set by a system initialization routine during system startup to configure grant encoding circuitry 308. Alternatively, enable signal 422 can be strapped or jumpered through an I/O pin to a low value or a high value.

Grant encoding circuitry 308 has two different modes of operation. During a first mode of operation when enable signal 422 has a zero value, grant lines (6:0) are encoded. MUX 412 selects encoded grant signals (2:0) to be passed through output buffers 414 and output pins 406. Once off chip, encoded grant lines (2:0) are subsequently decoded back into the seven original grant lines (6:0).

During the first mode of operation, request lines (6:5) pass through I/O pins 404, bi-directional buffers 416 and OR gates 408 before entering PCI arbiter 304. The five lower request lines (4:0) simply pass through input pins 402 and input buffers 418 into PCI arbiter 304.

Thus, in the first mode of operation, grant encoding circuitry 308 supports seven request lines (6:0) and seven grant lines (6:0) between PCI bus 114 and PCI arbiter 304.

During a second mode of operation, enable signal 422 is set to a high value. This causes MUX 412 to select the lower grant lines (2:0) to pass through output buffers 414 and output pins 406 onto PCI bus 114. Two other grant lines (4:3) pass through bi-directional buffers 416 and I/O pins 404 into PCI bus 114. This provides five total grant lines (4:0) for PCI bus 114.

During the second mode of operation, the five lower request lines (5:0) again pass through input buffers 418 into PCI arbiter 304. The two higher request lines (6:5) do not enter I/O pins 404, and the two higher request line inputs (6:5) to PCI arbiter 304 are disabled by OR gates 408 so that they remain unasserted.

Thus, in the second mode of operation, grant encoding circuitry 308 supports five request lines (4:0) and five grant lines (4:0) between PCI arbiter 304 and PCI bus 114. Also note that in the second mode of operation no external decoding circuitry is required.

First Mode of Operation

FIG. 5 illustrates grant encoding circuitry 308 used in the first mode of operation in accordance with an embodiment of the present invention. In the first mode of operation, seven request lines (6:0) feed from PCI bus 114 into PCI arbiter 304. Five of these request lines pass through input pins 402 into grant encoding circuitry 308 and into PCI arbiter 304. Another two request lines (6:5) pass through I/O pins 404 into grant encoding circuitry 308 and into PCI arbiter 304. Note that I/O pins 404 are first set into receive mode by asserting receive mode signal 504. At the same time, seven grant lines (6:0) feed into grant encoding circuitry 308, which encodes the seven grant lines into three encoded grant lines (2:0). The three encoded grant lines feed through output pins 406 into decoding unit 502. Decoding unit 502 decodes the three encoded grant lines into the original seven grant lines (6:0), which feed into PCI bus 114. Decoding unit 502 may be implemented in a number of ways, including through discrete logic, through a special-purpose decider chip or through a programmable logic device, such as a PLA.

Note the first mode of operation supports seven PCI masters. This is appropriate for a server computer system or workstation that requires multiple bus masters. Also note that the first mode of operation requires external decode logic. This external decode logic can add cost to the system. However, this additional cost is not likely to be significant in a server computer system, which tends to be expensive to begin with.

Second Mode of Operation

FIG. 6 illustrates grant encoding circuitry 308 used in the second mode of operation in accordance with an embodiment of the present invention. In the second mode of operation, five request lines (4:0) pass from PCI bus 114 across chip boundary 500, through input pins 402 and grant encoding circuitry 308, into PCI arbiter 304. At the same time five grant lines (4:0) from PCI arbiter 304 enter grant encoding circuitry 308. Upon passing through grant encoding circuitry 308, three of these grant lines (2:0) feed through output pins 406 onto PCI bus 114, and two of these grant lines (4:3) feed through I/O pins 404 onto PCI bus 114. (I/O pins 404 are first set into transmit mode by asserting transmit mode signal 604.) Note the second mode of operation only supports five PCI masters. The second mode is appropriate for personal computer systems or workstations that require only small numbers of PCI masters. Also note that the second mode of operation does not require external decode logic for grant lines, which can add cost to a computer system.

Selective Encoding Process

Figure 7:
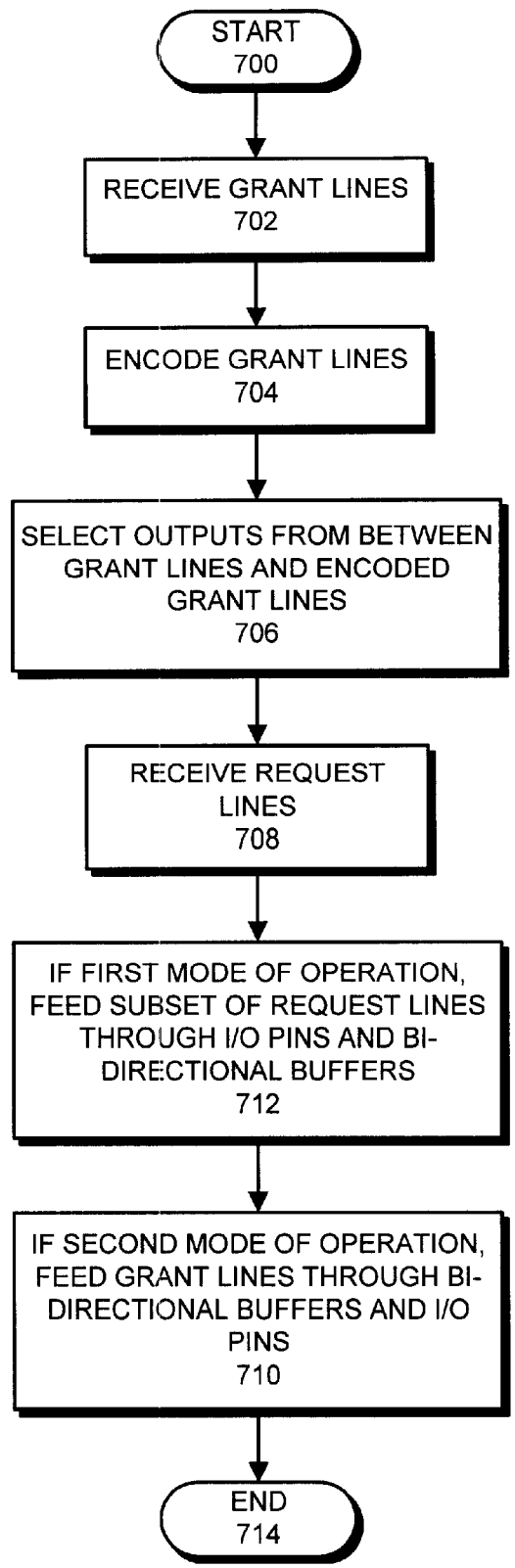
FIG. 7 is a flow chart illustrating the selective encoding process for grant lines in accordance with an embodiment of the present invention.

FIG. 7 is a flow chart illustrating the selective encoding process for grant lines (6:0) in accordance with an embodiment of the present invention. First, grant encoding circuitry 308 (from FIG. 4) receives grant lines (6:0) from PCI arbiter 304 (step 702). Grant lines (6:0) are then encoded in encode unit 410 (step 704). Next, MUX 412 selects between grant lines (2:0) in a first mode of operation, and encoded grant lines (2:0) in a second mode of operation (step 706). In the first mode of operation, the three encoded grant lines (2:0) are decoded in off chip decoding unit 502 (from FIG. 5) to produce seven grant lines (6:0) for PCI bus 114.

Grant encoding circuitry 308 also receives request lines (6:0) from PCI bus 114 (step 708). In the first mode of operation, request lines (6:5) feed through I/O pins 404, bi-directional buffers 416 and OR gates 408 into PCI arbiter 304 (step 710). The other request lines (4:0) feed through input pins 402 and input buffers 418 into PCI arbiter 304. This allows seven request lines (6:0) to pass from PCI bus 114 into PCI arbiter 304. In the second mode of operation, grant lines (4:3) feed through bi-directional buffers 416 and I/O pins 404 into PCI bus 114 (step 712). The other grant lines (2:0) feed through MUX 412, output buffers 414, and output pins 406 onto PCI bus 114. This allows five grant lines (4:0) to pass from PCI arbiter 304 to PCI bus 114. At the same time, five request lines (4:0) pass from PCI bus 114 through input pins 402 and input buffers 418 into PCI arbiter 304.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for selectively encoding bus grant lines to reduce I/O pin requirements, comprising:

receiving a plurality of grant lines emanating from a bus arbitration circuit for granting control of a bus to devices on the bus, the plurality of grant lines being divided into a first subset of grant lines and a second subset of grant lines;

encoding the plurality of grant lines into a plurality of encoded grant lines, the number of encoded grant lines being smaller than the number of grant lines;

selecting a plurality of outputs from between the plurality of encoded grant lines and the first subset of grant lines; and driving the plurality of outputs off of a semiconductor chip through a plurality of output pins;

wherein during a first mode of operation the first subset of grant lines is selected to be driven through the plurality of output pins, and during a second mode of operation the plurality of encoded grant lines is selected to driven through the plurality of output pins.

2. The method of claim 1, further comprising:

receiving a plurality of request lines, the plurality of request lines being used by devices on the bus to request control of the bus from the bus arbitration circuit, the plurality of request lines being divided into a first subset of request lines and a second subset of request lines;

wherein the first subset of request lines is received through a plurality of input pins from off of the semiconductor chip;

wherein during the first mode of operation the second subset of request lines is received from off of the semiconductor chip through a plurality of I/O pins through a plurality of bi-directional buffers and into the bus arbitration circuit, the first mode of operation allowing more request lines to be used in conjunction with the plurality of encoded grant lines; and during the second mode of operation, feeding the second subset of bus grant lines from the bus arbitration circuit through the plurality of bi-directional buffers through the plurality of I/O pins and off of the semiconductor chip, the second mode of operation allowing more pins to be used for grant lines when grant lines are not encoded.

3. The method of claim 2, further comprising driving the second subset of request lines inactive during the second mode of operation.

4. The method of claim 1, wherein selecting the plurality of outputs further comprises reading a configuration bit to select between the first mode of operation and the second mode of operation.

5. The method of claim 1, wherein selecting the plurality of outputs includes using a multiplexer to select the plurality of outputs.

6. The method of claim 1, wherein selecting the plurality of outputs includes receiving an enable signal that selects between the first mode of operation and the second mode of operation.

7. The method of claim 1, further comprising decoding the plurality of outputs at a decoding circuit located off of the semiconductor chip, so that signals from the plurality of encoded grant lines are decoded into their original form.

8. The method of claim 1, wherein the semiconductor chip includes a core logic unit that couples together computer system components.

9. The method of claim 8, wherein the core logic unit further comprises a central processing unit (CPU) interface and a memory interface.

10. The method of claim 1, wherein the plurality of output pins are implemented as bi-directional I/O pins.

11. The method of claim 1, wherein encoding the plurality of grant lines includes encoding the plurality of grant lines using unary to binary encoding.

12. The method of claim 1, wherein the bus arbitration circuit is part of a bus interface circuit, and wherein the bus interface circuit further comprises:

a bus master circuit that can initiate accesses over the bus; and a bus target circuit that can receive accesses from the bus.

13. The method of claim 1, wherein the bus includes a PCI bus.

14. A method for selectively encoding bus grant lines to reduce I/O pin requirements, comprising:

receiving a plurality of grant lines emanating from a bus arbitration circuit for granting control of a bus to devices on the bus, the plurality of grant lines being divided into a first subset of grant lines and a second subset of grant lines;

encoding the plurality of grant lines into a plurality of encoded grant lines, the number of encoded grant lines being smaller than the number of grant lines;

selecting a plurality of outputs from between the plurality of encoded grant lines and the first subset of grant lines;

driving the plurality of outputs off of a semiconductor chip through a plurality of output pins;

wherein during a first mode of operation the first subset of grant lines is selected to be driven through the plurality of output pins, and during a second mode of operation the plurality of encoded grant lines is selected to driven through the plurality of output pins;

receiving a plurality of request lines, the plurality of request lines being used by devices on the bus to request control of the bus from the bus arbitration circuit, the plurality of request lines being divided into a first subset of request lines and a second subset of request lines;

wherein the first subset of request lines is received through a plurality of input pins from off of the semiconductor chip;

wherein during the first mode of operation the second subset of request lines is received from off of the semiconductor chip through a plurality of I/O pins through a plurality of bi-directional buffers and into the bus arbitration circuit, the first mode of operation allowing more request lines to be used in conjunction with the plurality of encoded grant lines; and during the second mode of operation, feeding the second subset of bus grant lines from the bus arbitration circuit through the plurality of bi-directional buffers through the plurality of I/O pins and off of the semiconductor chip, the second mode of operation allowing more pins to be used for grant lines when grant lines are not encoded.

15. The method of claim 14, further comprising driving the second subset of request lines inactive during the second mode of operation.

16. The method of claim 14, wherein selecting the plurality of outputs further comprises reading a configuration bit that can be set by a configuration write operation to select between the first mode of operation and the second mode of operation.

17. The method of claim 14, wherein selecting the plurality of outputs includes using a multiplexer to select the plurality of outputs.

18. The method of claim 14, wherein selecting the plurality of outputs includes receiving an enable signal that selects between the first mode of operation and the second mode of operation.

19. The method of claim 14, further comprising decoding the plurality of outputs at a decoding circuit located off of the semiconductor chip, so that signals from the plurality of encoded grant lines are decoded into their original form.

20. The method of claim 14, wherein the bus arbitration circuit is part of a bus interface circuit, and wherein the bus interface circuit further comprises:

a bus master circuit that can initiate accesses over the bus; and a bus target circuit that can receive accesses from the bus.

* * * * *